US012179952B2

(12) United States Patent
Hayakawa

(10) Patent No.: US 12,179,952 B2

(45) Date of Patent: Dec. 31, 2024

(54) STERILIZATION METHOD

(71) Applicant: Dai Nippon Printing Co., Ltd., Tokyo (JP)

(72) Inventor: Atsushi Hayakawa, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 20 days.

(21) Appl. No.: 17/930,737

(22) Filed: Sep. 9, 2022

(65) Prior Publication Data

US 2023/0043811 A1 Feb. 9, 2023

Related U.S. Application Data

(63) Continuation of application No. PCT/JP2021/009692, filed on Mar. 10, 2021.

(30) Foreign Application Priority Data

Mar. 12, 2020 (JP) ................................ 2020-042934

(51) Int. Cl.

*B65B 55/10* (2006.01)
*B67C 7/00* (2006.01)
*B67C 3/26* (2006.01)

(52) U.S. Cl.

CPC .............. *B65B 55/10* (2013.01); *B67C 7/002* (2013.01); *B67C 7/004* (2013.01); *B67C 7/0073* (2013.01); *B67C 2003/2694* (2013.01)

(58) Field of Classification Search

CPC ....... B65B 55/10; B65B 55/02; B65B 55/027; B65B 55/18; B65B 55/22; B67C 7/002; B67C 7/004; B67C 7/0073; B67C 2003/2694

USPC ........................................................... 53/426

See application file for complete search history.

(56) References Cited

U.S. PATENT DOCUMENTS 8,806,840 B2 * 8/2014 Bierschneider ......... B67C 3/007 53/77
11,535,502 B2 * 12/2022 Hayakawa ............ B67C 7/0073
2009/0013645 A1 * 1/2009 Mastio .................. B67C 7/0073 53/425
2011/0056172 A1 * 3/2011 Klenk ....................... B65C 9/06 414/222.01

(Continued)

FOREIGN PATENT DOCUMENTS

EP 3 617 132 A1 3/2020
JP 2000-153245 A 6/2000

(Continued)

OTHER PUBLICATIONS

English translation of the International Preliminary Report on Patentability (Chapter I) (Application No. PCT/JP2021/009692) dated Sep. 22, 2022 (5 pages).

(Continued)

*Primary Examiner* — Sameh Tawfik

(74) *Attorney, Agent, or Firm* — BURR PATENT LAW, PLLC

(57) ABSTRACT

A sterilization method includes a sterilizer supplying step of supplying a sterilizer to a sterile zone conveyor while the sterile zone conveyor is being rotated, and a sterile water supplying step of supplying sterile water to the sterile zone conveyor while the sterile zone conveyor is being rotated.

10 Claims, 6 Drawing Sheets

(56) References Cited

U.S. PATENT DOCUMENTS

| | | | | |
|---|---|---|---|---|
| 2011/0094616 | A1* | 4/2011 | Hayakawa | B65B 55/10 141/85 |
| 2015/0059288 | A1* | 3/2015 | Wu | B65B 55/027 53/167 |
| 2016/0325975 | A1* | 11/2016 | Hayakawa | B67C 7/004 |
| 2019/0256336 | A1* | 8/2019 | Takaku | B67C 7/002 |
| 2021/0269298 | A1 | 9/2021 | Hayawaka et al. | |

FOREIGN PATENT DOCUMENTS

| | | | |
|---|---|---|---|
| JP | 3315918 | B2 | 8/2002 |
| JP | 2004-299723 | A | 10/2004 |
| JP | 2007-022600 | A | 2/2007 |
| JP | 2007-331801 | A | 12/2007 |
| JP | 2010-189034 | A | 9/2010 |
| JP | 2012-086879 | A | 5/2012 |
| JP | 2014-051304 | A | 3/2014 |
| JP | 2018-065599 | A | 4/2018 |
| JP | 2018-135134 | A | 8/2018 |
| JP | 2018-162108 | A | 10/2018 |
| WO | 2018/056411 | A1 | 3/2018 |
| WO | 2020/045521 | A1 | 3/2020 |

OTHER PUBLICATIONS

International Search Report and Written Opinion (Application No. PCT/JP2021/009692) dated Apr. 27, 2021 (with English translation).

Extended European Search Report dated Mar. 12, 2024 (Application No. 21768348.1).

Chinese Office Action (Application No. 202180018935.0) dated Nov. 6, 2023 (with English translation).

Japanese Office Action (Application No. 2021-148000) dated Mar. 24, 2023 (with English translation).

* cited by examiner

STERILIZATION METHOD

BACKGROUND OF THE INVENTION

Field of the Invention

The present disclosure relates to a sterilization method.

Description of Related Art

As a known example of a system for filling beverages into containers such as bottles, there has been a content filling system that sterilizes not only the beverage itself, but also a surge tank, pipes, a filling nozzle, and so on into a sterile state. In that type of content filling system, the so-called CIP (Cleaning in Place) and SIP (Sterilization in Place) are performed, for example, when the type of beverage is changed (e.g., Patent Literatures (Patent Documents) 1 to 3).

The CIP is to remove beverage residuals and so on having adhered to a beverage flow path and tank in the preceding cycle and is performed, for example, by pouring a cleaning liquid, prepared by adding an alkaline agent such as caustic soda to water, through the beverage flow path, and then further pouring a cleaning liquid, prepared by adding an acidic agent to water, through the beverage flow path.

The SIP is to sterilize the beverage flow path and tank into a sterile state and is performed, for example, by pouring heated steam or hot water through the flow path after the cleaning by the CIP.

Moreover, for the inside of a filling chamber in which a filling device for filling contents is disposed and the inside of an outlet chamber disposed on an outlet side of the filling chamber, the so-called COP (Cleaning out of Place) and SOP (Sterilizing out of Place) are performed to clean those chambers (e.g., Patent Documents 4 to 8).

Various injection nozzles are disposed inside the filling chamber and the outlet chamber. When the COP and the SOP are performed, a sterilizer, such as an alkaline detergent, a peracetic detergent, or aqueous hydrogen peroxide, and sterile water, for example, are successively injected from those nozzles in the form of a mist or a shower into the filling chamber and the outlet chamber. Inner wall surfaces of the filling chamber and the outlet chamber and surfaces of equipment such as a filling device (filler) are cleaned and sterilized with, for example, the mist or the shower of the sterilizer and the sterile water.

CITATION LIST

Patent Literature

PATENT DOCUMENT 1: Japanese Unexamined Patent Application Publication No. 2007-331801

PATENT DOCUMENT 2: Japanese Unexamined Patent Application Publication No. 2000-153245

PATENT DOCUMENT 3: Japanese Unexamined Patent Application Publication No. 2007-22600

PATENT DOCUMENT 4: Japanese Patent No. 3315918

PATENT DOCUMENT 5: Japanese Unexamined Patent Application Publication No. 2004-299723

PATENT DOCUMENT 6: Japanese Unexamined Patent Application Publication No. 2010-189034

PATENT DOCUMENT 7: Japanese Unexamined Patent Application Publication No. 2018-135134

PATENT DOCUMENT 8: Japanese Unexamined Patent Application Publication No. 2018-65599

In the sterilization for the above-described content filling system, an improvement of sterilization efficiency in the content filling system is demanded.

The present disclosure has been made in consideration of the above-described point, and an object of the present disclosure is to provide a sterilization method capable of improving the sterilization efficiency in the content filling system.

BRIEF SUMMARY OF THE INVENTION

In an embodiment, the present disclosure provides a sterilization method for an outlet-side structure disposed on an outlet side of a filling chamber in which a filling device to fill contents into bottles is disposed, the outlet-side structure including an outlet chamber that includes a sterile zone chamber connected to the filling chamber and a gray zone chamber connected to the sterile zone chamber, and a non-sterile zone connected to the outlet chamber, the sterile zone chamber including a sterile zone conveyor disposed therein to convey the bottles filled with the contents, the gray zone chamber including a gray zone conveyor disposed therein to receive the bottles from the sterile zone conveyor and to convey the bottles, the non-sterile zone including a non-sterile zone conveyor disposed therein to receive the bottles from the gray zone conveyor and to convey the bottles, wherein the sterilization method includes a sterilizer supplying step of supplying the sterilizer to the sterile zone conveyor while the sterile zone conveyor is being rotated, and a sterile water supplying step of supplying sterile water to the sterile zone conveyor while the sterile zone conveyor is being rotated.

In the sterilization method according to the embodiment, the gray zone conveyor may include multiple intermediate conveyors, and in the sterilizer supplying step and the sterile water supplying step, from among the multiple intermediate conveyors, an upstream-stage intermediate conveyor on a side closer to the sterile zone conveyor may be rotated, and a downstream-stage intermediate conveyor on a side closer to the non-sterile zone conveyor may be stopped.

In the sterilization method according to the embodiment, a storage section in which the sterilizer is stored may be formed in the sterile zone chamber and the gray zone chamber, and in the sterilizer supplying step, the sterile zone conveyor and the gray zone conveyor may be rotated while at least part of each of the sterile zone conveyor and the gray zone conveyor is immersed in the sterilizer inside the storage section.

In the sterilization method according to the embodiment, the gray zone conveyor may be formed by a single conveyor, and the gray zone conveyor may be stopped in the sterilizer supplying step and the sterile water supplying step.

In the sterilization method according to the embodiment, a storage section in which the sterilizer is stored may be formed in the sterile zone chamber and the gray zone chamber, and in the sterilizer supplying step, the sterile zone conveyor may be rotated while at least part of the sterile zone conveyor is immersed in the sterilizer inside the storage section.

In the sterilization method according to the embodiment, temperature of the sterilizer may be 50° C. or higher and 80° C. or lower in the sterilizer supplying step.

In the sterilization method according to the embodiment, the sterilizer may contain sodium hydroxide.

In the sterilization method according to the embodiment, the non-sterile zone conveyor may be stopped in the sterilizer supplying step.

In the sterilization method according to the embodiment, the non-sterile zone conveyor may be stopped in the sterile water supplying step.

In the sterilization method according to the embodiment, the sterile zone chamber may have a volume of 0.3 $m^3$ or more and 5 $m^3$ or less, and a supply amount of the sterilizer supplied to the sterile zone chamber may be 1.2 $m^3$/h or more and 12 $m^3$/h or less.

According to the present disclosure, the sterilization efficiency in the content filling system can be improved.

DETAILED DESCRIPTION OF THE INVENTION

An embodiment will be described below with reference to the drawings. FIGS. 1 to 9 illustrate the embodiment. The drawings described below are drawn in a schematic fashion. Thus, sizes and shapes of individual components are exaggerated as appropriate for easier understanding. The present disclosure can be implemented in forms modified as appropriate insofar as not departing from the technical concept of the present disclosure. In the following drawings, the same components are denoted by the same reference signs, and detailed description of those components is partly omitted in some cases. Numerical values indicating sizes of individual members explained in this Description and material names thereof are merely examples used in the embodiment, and the present disclosure is not limited to those examples, and the individual members can be appropriately selected in practical use. It is to be noted that, in this Description, terms specifying shapes and geometrical conditions, for example, terms such as “parallel”, “orthogonal”, and “vertical”, represent not only states exactly meant by the terms, but also substantially the same states.

(Content Filling System)

First, a content filling system (sterile filling system or aseptic filling system) including an outlet-side structure to be sterilized by a sterilization method according to the embodiment is described with reference to FIG. 1.

Figure 1:
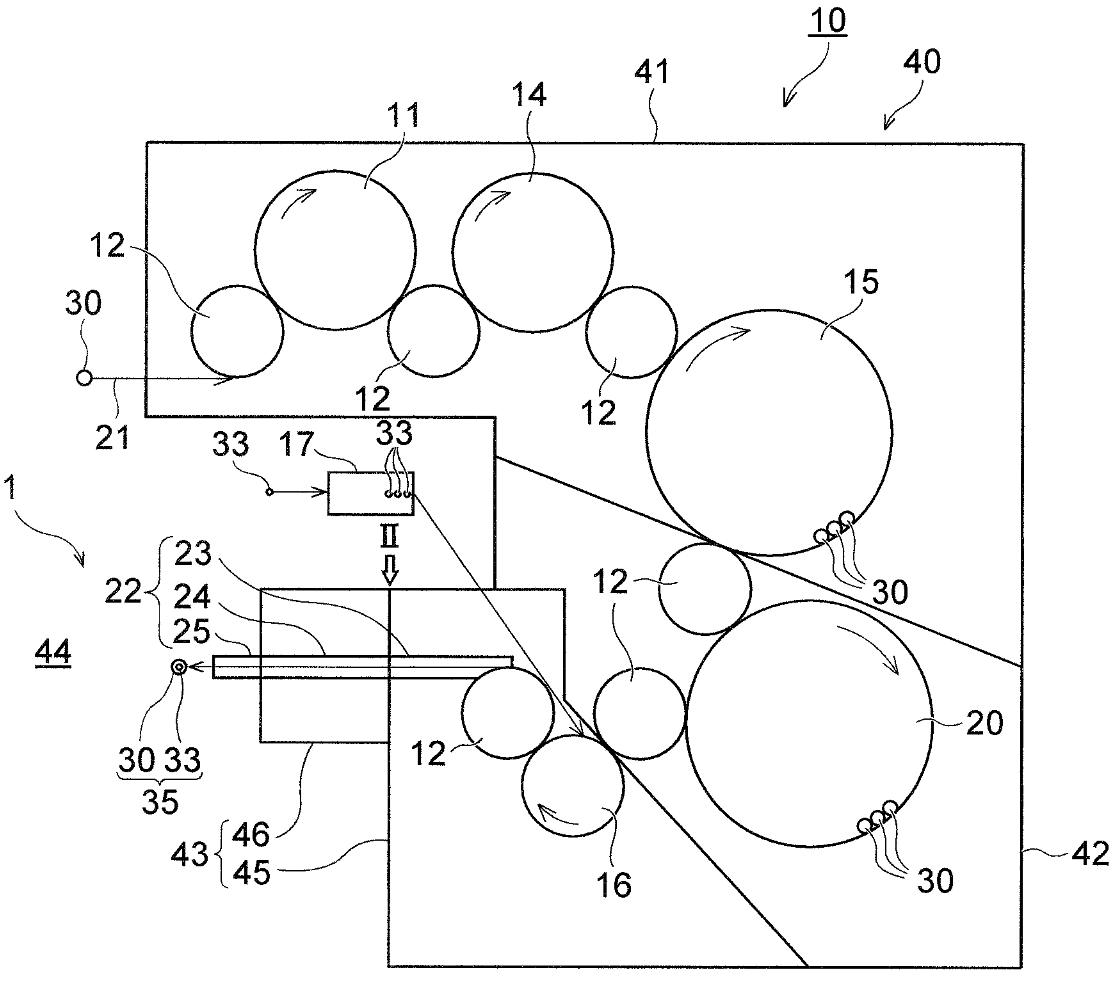
FIG. 1 is a schematic plan view of a content filling system that is sterilized by a sterilization method according to an embodiment of the present disclosure.

The content filling system 10 illustrated in FIG. 1 is a system for filling contents, such as beverages, into bottles 30. The bottles 30 can be each fabricated by biaxial stretching blow molding of a preform that is manufactured by injection molding of a synthetic resin material. Thermoplastic resin, particularly, PE (polyethylene), PP (polypropylene), PET (polyethylene terephthalate), or PEN (polyethylene naphthalate), is preferably used as a material of the bottle 30. Other containers, such as glass bottles, cans, paper containers, pouches, or composite containers made of different materials may also be used. This embodiment is described in connection with an example in which the bottle made of the synthetic resin is used as the container.

As illustrated in FIG. 1, the content filling system 10 includes a bottle supply section 21, a bottle sterilization device 11, an air rinsing device 14, a sterile water rinsing device 15, a filling device (filler) 20, a cap fitting device (capper or tightening and plugging machine) 16, and a product bottle carrying-out unit 22. The bottle supply section 21, the bottle sterilization device 11, the air rinsing device 14, the sterile water rinsing device 15, the filling device 20, the cap fitting device 16, and the product bottle carrying-out unit 22 are successively disposed in mentioned order along a conveying direction of the bottles 30 from an upstream side toward a downstream side. Between adjacent twos of the bottle sterilization device 11, the air rinsing device 14, the sterile water rinsing device 15, the filling device 20, and the cap fitting device 16, conveying wheels 12 are disposed to convey the bottles 30 between the devices.

The bottle supply section 21 successively receives the bottles 30 being empty into the content filling system 10 from the outside and conveys the received bottles 30 toward the bottle sterilization device 11.

A bottle molding section (not illustrated) for fabricating the bottles 30 by biaxial stretching blow molding of preforms may be disposed upstream of the bottle supply section 21. Thus, steps of supplying the preforms, molding the bottles 30, filling contents into the bottles 30, and plugging the bottles 30 may be performed continuously. In such a case, because materials can be conveyed from the outside to the content filling system 10 in the form of preforms with a relatively small volume instead of the bottles 30 with a relatively large volume, equipment constituting the content filling system 10 can be made more compact.

The bottle sterilization device 11 sterilizes the bottles 30 before filling of the contents and injects a sterilizer into the bottles 30 to sterilize the inside of each bottle 30. For example, an aqueous solution of hydrogen peroxide is used as the sterilizer. In the bottle sterilization device 11, the aqueous solution of hydrogen peroxide with a concentration of 1% by weight or more, preferably 35% by weight, is once vaporized and then condensed to a mist or gas, and the produced mist or gas is sprayed to inner and outer surfaces of the bottle 30. Since the inside of the bottle 30 is sterilized with the mist or the gas of the aqueous solution of hydrogen peroxide, the inner surface of the bottle 30 is sterilized evenly.

The air rinsing device 14 supplies sterile heated air or room-temperature air to the bottle 30, thereby removing foreign matters, the hydrogen peroxide, and so on from the inside of the bottle 30 while activating the hydrogen peroxide.

The sterile water rinsing device 15 rinses the bottle 30, after being sterilized with the hydrogen peroxide as the sterilizer, with sterile water at 15° C. or higher and 85° C. or lower. As a result, the foreign matters adhering to the bottle 30 are removed.

The filling device 20 fills contents, having been sterilized in advance, into the bottles 30 through their mouth portions. The filling device 20 fills the contents into the empty bottles 30. In the filling device 20, the contents are filled into the bottles 30 while the bottles 30 are being rotated (revolved). The contents may be filled into the bottles 30 at room temperature. The contents are sterilized in advance by heating, for example, and are filled into the bottles 30 after being cooled to the room temperature at 3° C. or higher and 40° C. or lower. The contents to be filled by the filling device 20 may be, for example, beverages such as tea and milk beverages.

The cap fitting device 16 fits a cap 33 to the mouth portion of each bottle 30 after the filling of the contents by the filling device 20, thus plugging the bottle 30. In the cap fitting device 16, the mouth portion of the bottle 30 is closed by the cap 33 and is sealed off such that outside air and bacteria will not enter the inside of the bottle 30. In the cap fitting device 16, the caps 33 are fitted to the mouth portions of the bottles 30 filled with the contents while the bottles 30 are being rotated (revolved). By fitting the caps 33 to the mouth portions of the bottles 30 as described above, product bottles 35 are obtained.

The caps 33 are sterilized in advance by a cap sterilization device 17. The cap sterilization device 17 is disposed at a position, for example, outside a sterile chamber 40 (described later) and near the cap fitting device 16. In the cap sterilization device 17, the caps 33 having been carried into there from the outside are successively conveyed toward the cap fitting device 16. Midway the conveyance of the caps 33 toward the cap fitting device 16, a mist or gas of hydrogen peroxide is sprayed toward inner and outer surfaces of the caps 33, and the caps 33 are then dried with hot air. As a result, the caps 33 are sterilized.

The product bottle carrying-out unit 22 successively carries out the product bottles 35 including the caps 33 fitted by the cap fitting device 16 toward the outside of the content filling system 10. The product bottle carrying-out unit 22 includes a sterile zone conveyor 23 disposed in a sterile zone chamber 45 described later, a gray zone conveyor 24 disposed in a gray zone chamber 46 described later, and a non-sterile zone conveyor 25 disposed in a non-sterile zone 44 described later.

The above-described content filling system 10 includes the sterile chamber 40. The sterile chamber 40 includes a sterilization chamber 41, a filling chamber 42, and an outlet chamber 43. The sterilization chamber 41 is disposed on an inlet side of the filling chamber 42, and the outlet chamber 43 is disposed on an outlet side of the filling chamber 42. Thus, the sterilization chamber 41, the filling chamber 42, and the outlet chamber 43 are successively disposed in mentioned order along the conveying direction of the bottles 30 from the upstream side toward the downstream side. A gap with such a size as enough for the bottle 30 or the like to pass therethrough is formed between adjacent two of the chambers 41, 42 and 43. The gap size is held at a minimum value, for example, approximately the size of one bottle 30. Pressures in the chambers 41, 42 and 43 are set such that the pressure in the filling chamber 42 is highest, namely about 30 Pa or higher and about 100 Pa or lower, and that the pressures in the sterilization chamber 41 and the outlet chamber 43 are comparable, namely 1 Pa or higher and 30 Pa or lower. As illustrated in FIG. 1, a wall between the filling chamber 42 and the outlet chamber 43 may be disposed between the filling device 20 and the cap fitting device 16. More specifically, the above-mentioned wall may be disposed between the cap fitting device 16 and the conveying wheel 12. Each wall between adjacent two of the chambers is not always required to be disposed at a position illustrated in FIG. 1. In another example, although not illustrated, a wall may be disposed between the air rinsing device 14 and the sterile water rinsing device 15.

In the illustrated example, the bottle sterilization device 11, the air rinsing device 14, and the sterile water rinsing device 15 are disposed in the sterilization chamber 41 whereas the filling device 20 and the cap fitting device 16 are disposed in the filling chamber 42. The product bottle carrying-out unit 22 is disposed in the outlet chamber 43.

(Outlet-Side Structure)

An outlet-side structure 1 sterilized by the sterilization method according to the embodiment will be described below with reference to FIGS. 1 and 2.

Figure 2:
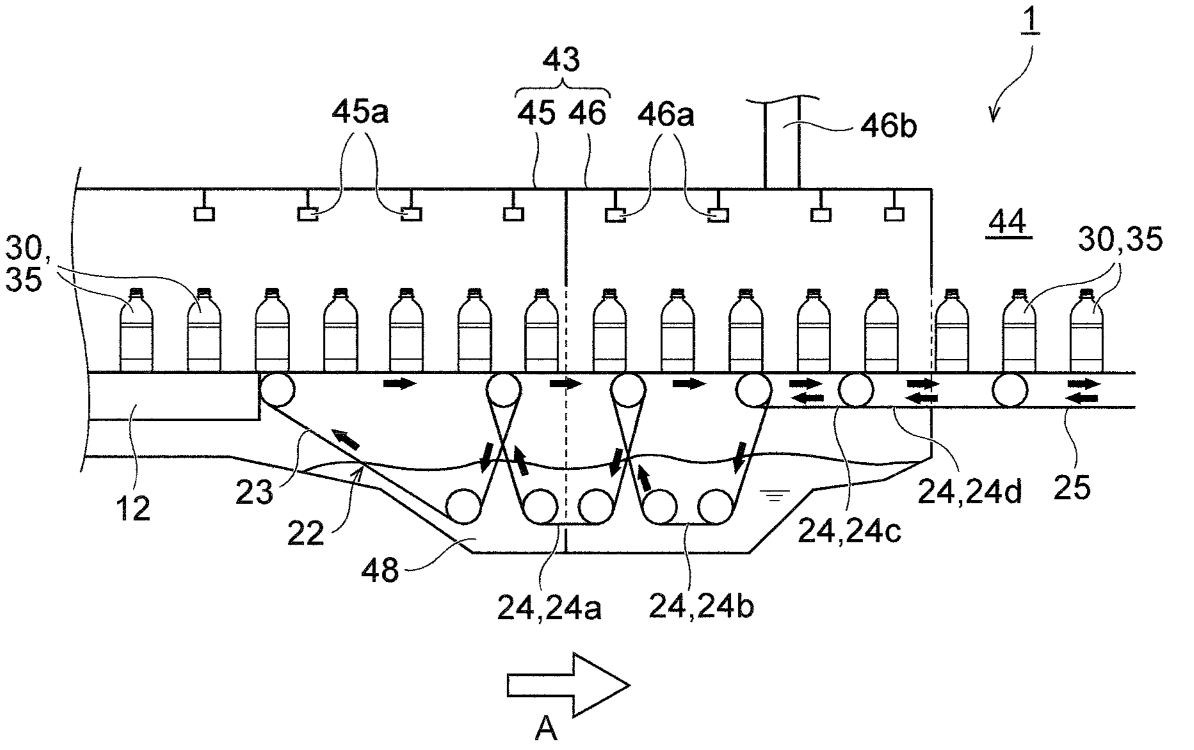
FIG. 2 is a schematic front view (when viewed in a direction denoted by an arrow II in FIG. 1) illustrating an outlet-side structure of the content filling system that is sterilized by the sterilization method according to the embodiment of the present disclosure.

As illustrated in FIGS. 1 and 2, the outlet-side structure 1 is disposed on the outlet side of the filling chamber 42 in which the filling device 20 is disposed. The outlet-side structure 1 includes the above-mentioned outlet chamber 43 and a non-sterile zone 44 connected to the outlet chamber 43. The outlet chamber 43 includes the sterile zone chamber 45 connected to the filling chamber 42 and the gray zone chamber 46 connected to the sterile zone chamber 45. A gap with such a size as enough for the bottle 30 or the like to pass therethrough is formed between adjacent two of the chambers 45 and 46 and the non-sterile zone 44. The gap size is held at a minimum value, for example, approximately the size of one bottle 30, such that the pressures in the chambers 45 and 46 will not change.

The inside of the sterile zone chamber 45 in the outlet chamber 43 is kept in a sterile state. The inside of the sterile zone chamber 45 is maintained under positive pressure with supply of sterile air such that fungi will not enter the sterile zone chamber 45. For instance, the pressure in the sterile zone chamber 45 may be 1 Pa or higher and 30 Pa or lower. Devices inside the sterile zone chamber 45 are sterilized when the SOP of the content filling system 10 is performed.

The sterile zone conveyor 23 for conveying the bottles 30 filled with the contents is disposed in the sterile zone chamber 45. The sterile zone conveyor 23 receives the bottles 30 from the conveying wheel 12 disposed in the sterile zone chamber 45 and transfers the bottles 30 to the gray zone conveyor 24 described later. In the illustrated example, the sterile zone conveyor 23 is formed by a single conveyor. However, the present disclosure is not limited to such an example, and the sterile zone conveyor 23 may include multiple conveyors.

The gray zone chamber 46 is disposed between the sterile zone chamber 45 and the non-sterile zone 44 positioned on an outlet side of the gray zone chamber 46 and isolates a sterile atmosphere and a non-sterile atmosphere from each other. Fungi may enter the gray zone chamber 46. However, the gray zone chamber 46 is configured such that fungi having entered the gray zone chamber 46 will not enter the sterile zone chamber 45. The pressure in the gray zone chamber 46 is set to be lower than that in the sterile zone chamber 45. Accordingly, the fungi having entered the gray zone chamber 46 from the non-sterile zone 44 can be inhibited from entering the sterile zone chamber 45. Furthermore, an exhaust line 46*b* is connected to the gray zone chamber 46. Air inside the gray zone chamber 46 is exhausted through the exhaust line 46*b*. Because the air inside the gray zone chamber 46 is exhausted through the exhaust line 46*b*, the pressure in the gray zone chamber 46 is kept lower than that in the sterile zone chamber 45. For instance, the pressure in the gray zone chamber 46 may be −20 Pa or higher and 1 Pa or lower. While, in the illustrated example, the exhaust line 46*b* is connected to only the gray zone chamber 46, the present disclosure is not limited to such a case. In another example, although not illustrated, an exhaust line may be connected to the sterile zone chamber 45 as well, and air may be exhausted from both the sterile zone chamber 45 and the gray zone chamber 46. Devices inside the gray zone chamber 46 may or may not be sterilized when the SOP of the content filling system 10 is performed.

The gray zone conveyor 24 for receiving the bottles 30 from the sterile zone conveyor 23 and conveying the bottles 30 is disposed in the gray zone chamber 46. The gray zone conveyor 24 transfers the bottles 30 to the non-sterile zone conveyor 25 disposed in the non-sterile zone 44.

The non-sterile zone 44 is a zone where fungi may exist. Devices inside the non-sterile zone 44 do not always need to be sterilized when the SOP of the content filling system 10 is performed. The non-sterile zone conveyor 25 for receiving the bottles 30 from the gray zone conveyor 24 and conveying the bottles 30 is disposed in the non-sterile zone 44. The gray zone conveyor 24 transfers the bottles 30 to the non-sterile zone conveyor 25 disposed in the non-sterile zone 44.

In this embodiment, the gray zone conveyor 24 includes multiple intermediate conveyors 24*a* to 24*d*. In the illustrated example, the gray zone conveyor 24 includes the upstream-stage intermediate conveyor 24*a* on a side closer to the sterile zone conveyor 23, a first midstream-stage intermediate conveyor 24*b* disposed downstream of the upstream-stage intermediate conveyor 24*a*, a second midstream-stage intermediate conveyor 24*c* disposed downstream of the first midstream-stage intermediate conveyor 24*b*, and a downstream-stage intermediate conveyor 24*d* disposed on a side closer to the non-sterile zone conveyor 25. The upstream-stage intermediate conveyor 24*a*, the first midstream-stage intermediate conveyor 24*b*, the second midstream-stage intermediate conveyor 24*c*, and the downstream-stage intermediate conveyor 24*d* are successively disposed along the conveying direction of the bottles 30 (i.e., the direction denoted by an arrow A in FIG. 2).

The upstream-stage intermediate conveyor 24*a* is arranged while straddling the sterile zone chamber 45 and the gray zone chamber 46. The upstream-stage intermediate conveyor 24*a* receives the bottles 30 from the sterile zone conveyor 23 disposed in the sterile zone chamber 45.

The first midstream-stage intermediate conveyor 24*b* and the second midstream-stage intermediate conveyor 24*c* are each arranged to be entirely included in the gray zone chamber 46. The first midstream-stage intermediate conveyor 24*b* and the second midstream-stage intermediate conveyor 24*c* convey the bottles 30, having been conveyed into the gray zone chamber 46 by the upstream-stage intermediate conveyor 24*a*, to the downstream side.

The downstream-stage intermediate conveyor 24*d* is arranged while straddling the gray zone chamber 46 and the non-sterile zone 44. The downstream-stage intermediate conveyor 24*d* transfers the bottles 30 to the non-sterile zone conveyor 25 disposed in the non-sterile zone 44.

Here, as illustrated in FIG. 2, a storage section 48 in which the sterilizer is stored is formed in the sterile zone chamber 45 and the gray zone chamber 46. The sterile zone conveyor 23 and the gray zone conveyor 24 are rotated while at least part of each of those conveyors is immersed in the sterilizer inside the storage section 48. In the illustrated example, the sterile zone conveyor 23, the upstream-stage intermediate conveyor 24*a*, and the first midstream-stage intermediate conveyor 24*b*, the latter two belonging to the gray zone conveyor 24, are rotated while those conveyors are immersed in the sterilizer inside the storage section 48.

The sterile zone conveyor 23 and the gray zone conveyor 24 have the role of carrying out the sealed bottles 30 from a place under the sterile atmosphere to a place under the non-sterile atmosphere. Although the inside of the sterile zone chamber 45 is under the sterile atmosphere, the outside of the outlet chamber 43 from which the sealed bottles 30 are carried out is under the non-sterile atmosphere. Thus, the downstream-stage intermediate conveyor 24*d* straddling the gray zone chamber 46 and the non-sterile zone 44 circulates through the sterile atmosphere and the non-sterile atmosphere. Accordingly, there is a possibility that fungi remaining in the non-sterile zone 44 may adhere to the downstream-stage intermediate conveyor 24*d* and may enter the gray zone chamber 46. This further leads to a possibility that the fungi having been carried by the downstream-stage intermediate conveyor 24*d* may adhere to the adjacent second midstream-stage intermediate conveyor 24*c*. As seen from the above, when the fungi having entered the gray zone chamber 46 are moved between the adjacent conveyors, there is a risk that the fungi may enter the sterile zone chamber 45 because the fungi are carried from the downstream side to the upstream side in the conveying direction of the bottles 30. However, since the gray zone conveyor 24 is rotated while at least part thereof is immersed in the sterilizer inside the storage section 48, the gray zone conveyor 24 can be sterilized even when fungi and so on adhere to the gray zone conveyor 24. As a result, the fungi can be inhibited from being carried into the sterile zone chamber 45, and the inside of the sterile zone chamber 45 can be inhibited from being contaminated with the fungi.

The sterilization chamber 41, the filling chamber 42, and the outlet chamber 43 (i.e., the sterile zone chamber 45 and the gray zone chamber 46) include, respectively, injection nozzles 41*a*, 42*a*, 45*a* and 46*a* (see FIG. 2 or 3) for injecting the sterilizer and so on in the form of a mist or a shower when the COP and/or the SOP is performed on the content filling system 10.

The content filling system 10 may be, for example, a sterile filling system. In this case, the inside of the sterile chamber 40 is kept in a sterile state. In another example, the content filling system 10 may be a high-temperature filling system in which contents are filled under high temperature of 85° C. or higher and lower than 100° C. In still another example, the content filling system 10 may be a medium-temperature filling system in which contents are filled under medium temperature of 55° C. or higher and lower than 85° C.

(Sterilization System)

A sterilization system to perform the sterilization method according to the embodiment will be described below with reference to FIG. 3.

Figure 3:
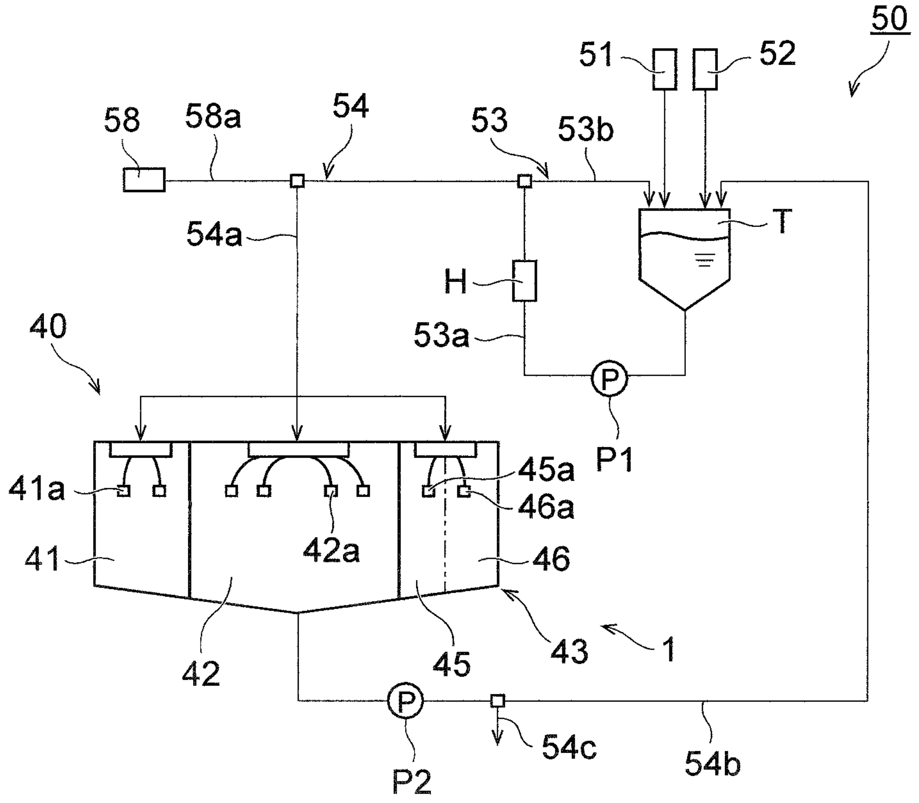
FIG. 3 is a block diagram of a sterilization system performing the sterilization method according to the embodiment of the present disclosure.
Figure 4:
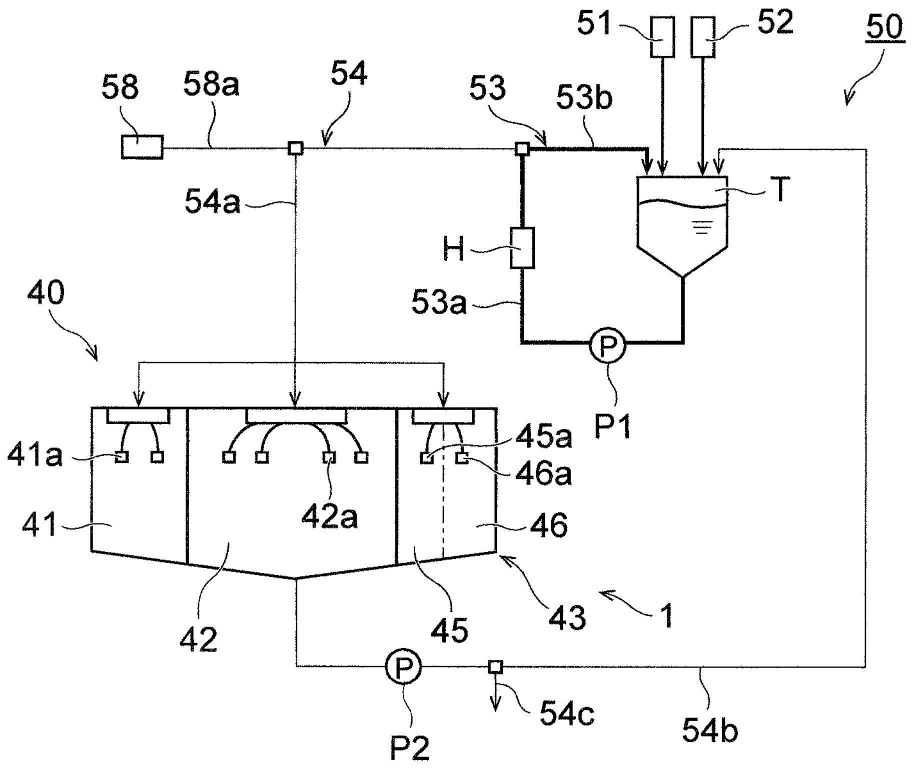
FIG. 4 is a block diagram illustrating the sterilization method according to the embodiment of the present disclosure.

As illustrated in FIG. 3, a sterilization system 50 includes a tank T for storing the sterilizer, a water supply unit 51 for supplying water to the tank T, a sterilizer concentrate supply unit 52 for supplying a sterilizer concentrate to the tank T, a circulation line 53 connected to the tank T, and a supply line 54 disposed between the circulation line 53 and the tank T.

As described above, the tank T stores the sterilizer. Because of the sterilizer being stored in the tank T, the sterilizer can be prepared in advance during, for example, manufacturing of products, and therefore a down time can be shortened. The sterilizer stored in the tank T is prepared from water and the sterilizer concentrate and may be an alkaline detergent, a peracetic detergent, aqueous hydrogen peroxide, or the like as described later.

A volume of the tank T is preferably twice or more and 100 times or less than that of the sterile chamber 40. With the volume of the tank T being twice or more than that of the sterile chamber 40, the sterilizer is avoided from running out during the sterilization in the sterile chamber 40. Thus, interruption of the sterilization in the sterile chamber 40 can be avoided unlike the case of additionally making up the shortage of the sterilizer. Therefore, a sterilization time in the sterile chamber 40 can be shortened. With the volume of the tank T being 100 times or less than that of the sterile chamber 40, the sterilizer can be avoided from being prepared more than necessary. This results in energy saving. Although depending on a volume of the sterile chamber 40 that is to be sterilized, the volume of the tank T may be, for example, 0.1 $m^3$ or more and 5.0 $m^3$ or less and preferably 1.5 $m^3$ or more and 3.0 $m^3$ or less.

The water supply unit 51 supplies water for use in diluting the sterilizer concentrate to the tank T. The water supplied from the water supply unit 51 may not need to be sterile water. When the water supplied from the water supply unit 51 is not the sterile water, the cost in preparing the sterilizer can be reduced. The water supplied from the water supply unit 51 may be, RO water, pure water, ion exchanged water, or general water (tap water). The water supplied from the water supply unit 51 may have temperature of about 10° C. or higher and about 30° C. or lower. In an example, the temperature of the supplied water may be approximately 15° C.

The sterilizer concentrate supply unit 52 supplies the sterilizer concentrate, used in preparing the sterilizer, to the tank T. The sterilizer concentrate supplied from the sterilizer concentrate supply unit 52 may be an aqueous alkaline solution containing, for example, sodium hydroxide as an alkaline component, an aqueous solution of peracetic acid, aqueous hydrogen peroxide, or the like. In an example, when the sterilizer concentrate is the aqueous alkaline solution containing sodium hydroxide, it may be the aqueous alkaline solution containing about 20% by weight or more and about 50% by weight or less of sodium hydroxide. In another example, when the sterilizer concentrate is the aqueous solution of peracetic acid, it may be the aqueous solution of peracetic acid containing about 10% by weight or more and about 15% by weight or less of peracetic acid. In still another example, when the sterilizer concentrate is the aqueous hydrogen peroxide, it may be the aqueous hydrogen peroxide containing about 0.5% by weight or more and about 35% by weight or less of hydrogen peroxide. Other drugs inactivating bacteria, such as potassium hydroxide and potassium hypochlorite, can also be used as the sterilizer concentrate.

The sterilizer prepared from the above-described sterilizer concentrate may include, for example, about 0.5% by weight or more and about 5% by weight or less of sodium hydroxide. The sterilizer may include, for example, about 0.15% by weight or more and about 0.4% by weight or less of peracetic acid. The sterilizer may include, for example, about 0.5% by weight or more and about 35% by weight or less of hydrogen peroxide.

The circulation line 53 circulates the sterilizer stored in the tank T and heats the sterilizer up to a desired temperature. A heater H for heating the sterilizer is disposed in the circulation line 53. In more detail, the circulation line 53 includes a first supply pipe 53*a* connected to the tank T and a first feedback pipe 53*b* connected to the first supply pipe 53*a*. From among those pipes, the first supply pipe 53*a* serves to supply the sterilizer from the tank T. The above-mentioned heater H and a pump P1 for circulating the sterilizer are disposed in the first supply pipe 53*a*. On the other hand, the first feedback pipe 53*b* serves to return the sterilizer having passed through the first supply pipe 53*a* to the tank T. The first feedback pipe 53*b* is connected to the tank T. The above-mentioned heater H may be disposed in the first feedback pipe 53*b*.

The supply line 54 sends the sterilizer having been heated through the circulation line 53 toward the downstream side. The sterile chamber 40 (i.e., the sterilization chamber 41, the filling chamber 42, and the outlet chamber 43) are disposed midway the supply line 54. In more detail, the supply line 54 includes a second supply pipe 54*a* connected to both the first supply pipe 53*a* and the first feedback pipe 53*b* in the circulation line 53 and disposed upstream of the sterile chamber 40, a second feedback pipe 54*b* connected to the sterile chamber 40 and disposed downstream of the sterile chamber 40, and a drainpipe 54*c* connected to the second feedback pipe 54*b*. From among those pipes, the second supply pipe 54*a* is branched into multiple pipes on an upstream side of the sterile chamber 40 such that the sterilizer can be supplied to the sterilization chamber 41, the filling chamber 42, and the outlet chamber 43 in the sterile chamber 40 independently of one another. The second feedback pipe 54*b* serves not only to discharge the sterilizer from the sterile chamber 40, but also to return the sterilizer having passed through the sterile chamber 40 to the tank T. The second feedback pipe 54*b* is connected to the tank T. A pump P2 for returning the sterilizer to the tank T is disposed in the second feedback pipe 54*b*. The drainpipe 54*c* serves to discharge the sterilizer as a waste liquid to the outside after the sterilization in the sterile chamber 40.

A sterile water supply unit 58 is connected to the second supply pipe 54*a* in the supply line 54 through a sterile water supply pipe 58*a*. With the sterile water supply unit 58 supplying the sterile water to the second supply pipe 54*a* in the supply line 54, the sterile water is supplied to the sterile chamber 40.

Although not illustrated, valves or the likes for switching flow paths are disposed in the circulation line 53 and the supply line 54 (hereinafter referred to simply as the "circulation line 53 and so on"). Although not illustrated, thermometers are also disposed in the circulation line 53 and so on. Temperature information measured by the thermometers are sent to a controller (not illustrated). In addition to the above-mentioned valves and thermometers (not illustrated) or actuators (not illustrated), various meters such as flow meters and densitometers, various selector valves, filters, etc. are further disposed in the circulation line 53 and so on. Those components are also controlled in accordance with signals from the controller (not illustrated).

(Sterilization Method)

Operation of the embodiment will be described below. The sterilization method for sterilizing the outlet-side structure 1 with the sterilization system 50 is described here in relation to the content filling system 10 with reference to FIGS. 4 to 9. The sterilization method according to the embodiment can be suitably applied to, for example, the COP and the SOP of the content filling system 10, which may be performed after the CIP and the SIP of the content filling system 10. In FIGS. 4, 5, 7 and 8, the pipes and so on through which water, the sterilizer concentrate, or the sterilizer pass are denoted by thick lines.

First, an operation button (not illustrated) of the controller is operated. In response to the operation of the button, water is supplied to the tank T from the water supply unit 51. The sterilizer concentrate is also supplied to the tank T from the sterilizer concentrate supply unit 52. Thus, the sterilizer concentrate is diluted with the water in the tank T, and the sterilizer is prepared. Here, the sterilizer may be an aqueous alkaline solution containing about 0.5% by weight or more and about 5% by weight or less of sodium hydroxide, or an aqueous solution of peracetic acid containing about 0.15% by weight or more and about 0.4% by weight or less of peracetic acid. Alternatively, the sterilizer may be the aqueous hydrogen peroxide containing about 0.5% by weight or more and about 35% by weight or less of hydrogen peroxide.

(Circulation Step)

Then, the sterilizer in the tank T is circulated through the circulation line 53 while the sterilizer is being heated by the heater H. In this embodiment, the pump P1 in the circulation line 53 is driven, and the sterilizer supplied to the tank T is circulated through the circulation line 53 (see FIG. 4). Here, the first supply pipe 53*a* and the first feedback pipe 53*b* are communicated with each other through a valve (not illustrated). On the other hand, the first supply pipe 53*a* and the second supply pipe 54*a* in the supply line 54 are not communicated with each other. Thus, the sterilizer is not supplied to the filling chamber 42 until the sterilizer is heated to the desired temperature. Accordingly, as described later, even when fungi survive in the sterilizer prepared in the tank T, the sterilizer containing the fungi surviving therein is inhibited from being supplied to the filling chamber 42 and so on.

During the circulation of the sterilizer through the circulation line 53, the heater H in the circulation line 53 is driven, and the sterilizer is heated by the heater H. The sterilizer is heated to temperature of, for example, 50° C. or higher and 80° C. or lower and preferably 60° C. or higher and 80° C. or lower. A circulation time for the sterilizer to circulate through the circulation line 53 may be 5 min or longer and 60 min or shorter. When the circulation time of the sterilizer is 5 min or longer, the sterilizer can be easily heated up to the desired temperature without installing a large-sized heater or multiple heaters. When the circulation time of the sterilizer is 60 min or shorter, the sterilization time can be suppressed from becoming too long, and the down time can be shortened.

Although depending on the power of the heater H and the capacity of the tank T, the supply of the water and the sterilizer concentrate to the tank T and the circulation of the sterilizer through the circulation line 53 may be started at timing during the filling of beverages in the content filling system 10 or during the CIP or the SIP of the content filling system 10. After the end of production of the beverages, preparations for cleaning, such as recovering packing materials (the bottles 30 and the caps 33) remaining in the filling chamber 42 and so on, are performed in some cases prior to starting the COP or the SOP of the filling chamber 42. In such a case, the sterilizer is preferably adjusted to a predetermined concentration and circulated under heating to the desired temperature during the preparation for cleaning. Thus, according to this embodiment, since the sterilizer in the tank T can be previously heated to the desired temperature during, for example, the CIP or the SIP of the content filling system 10, the down time in the sterilization process can be shortened.

(Sterilizer Supplying Step)

Then, the sterilizer having been heated by the heater H is supplied to the sterile chamber 40 through the supply line 54. On that occasion, the sterilizer having been heated by the heater H is supplied to the sterilization chamber 41 and the filling chamber 42 in the sterile chamber 40 and to the sterile zone chamber 45 in the outlet chamber 43. However, the sterilizer is not supplied to the gray zone chamber 46 in the outlet chamber 43. Thus, the sterilizer can be inhibited from flowing out to the non-sterile zone 44.

Figure 5:
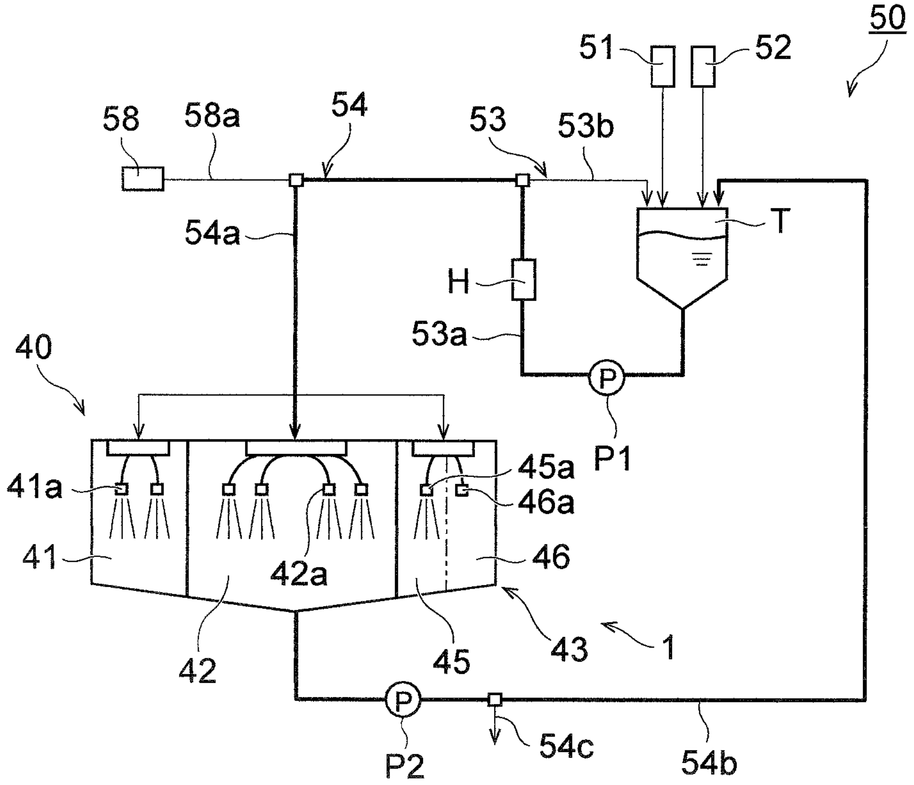
FIG. 5 is a block diagram illustrating the sterilization method according to the embodiment of the present disclosure.

In starting to supply the sterilizer to the sterile chamber 40 through the supply line 54, an operation button (not illustrated) of the controller is first operated. With the operation of the button, a valve (not illustrated) is switched, whereupon the first supply pipe 53*a* and the second supply pipe 54*a* are communicated with each other. Then, as illustrated in FIG. 5, the sterilizer is supplied from the tank T to the second supply pipe 54*a* of the supply line 54 through the first supply pipe 53*a* of the circulation line 53. At that time, the sterilizer may be further heated by the heater H.

Then, the sterilizer having been supplied to the second supply pipe 54*a* passes through the second supply pipe 54*a* and is supplied to the sterilization chamber 41 and the filling chamber 42 in the sterile chamber 40 and to the sterile zone chamber 45 in the outlet chamber 43. Thus, the sterilizer is injected into the chambers 41, 42 and 45 through the injection nozzles 41*a*, 42*a* and 45*a* disposed in the chambers 41, 42 and 45, respectively.

Here, the sterilizer supplied to the sterile zone chamber 45 is injected by the injection nozzle 45*a* toward the sterile zone conveyor 23 inside the sterile zone chamber 45. This enables the sterilizer to attach to a portion of the sterile zone conveyor 23, the portion being not immersed in the sterilizer stored in the sterilizer storage section 48, whereby sterilization efficiency for the sterile zone conveyor 23 can be increased. In this case, when the sterile zone chamber 45 has a volume of about 0.3 $m^3$ or more and about 5 $m^3$ or less, for example, a supply amount of the sterilizer supplied to the sterile zone chamber 45 may be about 1.2 $m^3$/h or more and about 12 $m^3$/h or less and preferably about 2 $m^3$/h or more and about 8 $m^3$/h or less. With the supply amount of the sterilizer being 1.2 $m^3$/h or more, the sterilization efficiency for the sterile zone conveyor 23 can be increased. With the supply amount of the sterilizer being 12 $m^3$/h or less, an amount of the sterilization used can be reduced, and the cost of the sterilizer supplying step can be reduced.

Figure 6:
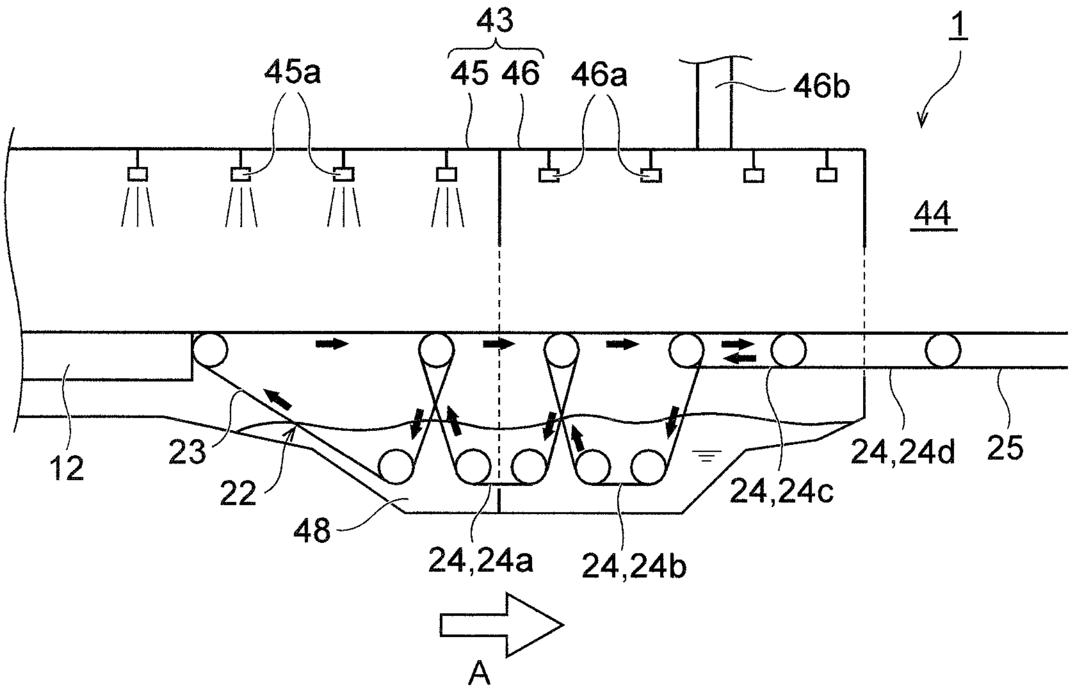
FIG. 6 is a schematic front view illustrating the sterilization method according to the embodiment of the present disclosure.

As illustrated in FIG. 6, when the sterilizer is supplied to the sterile zone chamber 45 in the outlet chamber 43, the sterilizer is supplied to the sterile zone conveyor 23 while the sterile zone conveyor 23 is being rotated. This enables the sterilizer to evenly attach to the entirety of the sterile zone conveyor 23. Therefore, the sterilization efficiency for the sterile zone conveyor 23 can be increased. On that occasion, the non-sterile zone conveyor 25 may be stopped. This enables the sterilizer to be inhibited from flowing out to the non-sterile zone 44 even when the sterilizer attaching to the sterile zone conveyor 23 is carried toward the downstream side in the conveying direction of the bottles 30 (i.e., the direction denoted by an arrow A in FIG. 6) with the rotation of the sterile zone conveyor 23. As a result, a worker working in the non-sterile zone 44 can be avoided from touching the sterilizer, and the safety of work performed by the worker can be improved.

During the above-described operation, from among the multiple intermediate conveyors 24*a* to 24*d* of the gray zone conveyor 24, the upstream-stage intermediate conveyor 24*a* may be rotated, and the downstream-stage intermediate conveyor 24*d* may be stopped. In this case, the upstream-stage intermediate conveyor 24*a* of the gray zone conveyor 24 is rotated together with the adjacent sterile zone conveyor 23. Accordingly, the sterilizer attaching to the sterile zone conveyor 23 is scattered, and the scattered sterilizer attaches to the upstream-stage intermediate conveyor 24*a* adjacent to the sterile zone conveyor 23. With the rotation of the upstream-stage intermediate conveyor 24*a*, the sterilizer is evenly attached to the entirety of the upstream-stage intermediate conveyor 24*a*.

As described above, the gray zone conveyor 24 carries out the sealed bottles 30 from the place under the sterile atmosphere to the place under the non-sterile atmosphere. Thus, the gray zone conveyor 24 circulates through the sterile atmosphere and the non-sterile atmosphere. This leads to a possibility that fungi remaining in the non-sterile zone 44 may adhere to the downstream-stage intermediate conveyor 24*d* of the gray zone conveyor 24 and may enter the gray zone chamber 46. Moreover, the fungi having entered the gray zone chamber 46 may be moved between the adjacent conveyors in such a manner, for example, that the fungi having been carried with the downstream-stage intermediate conveyor 24*d* adhere to the adjacent second midstream-stage intermediate conveyor 24*c*. This raises a risk that the fungi may be carried from the downstream side toward the upstream side along the conveying direction of the bottles 30 and may enter the sterile zone chamber 45.

In this embodiment, however, the upstream-stage intermediate conveyor 24*a* is rotated such that the sterilizer can be evenly attached to the entirety of the upstream-stage intermediate conveyor 24*a*. Accordingly, even when fungi have adhered to the upstream-stage intermediate conveyor 24*a* adjacent to the sterile zone conveyor 23, the fungi can be killed. As a result, even when fungi have entered the gray zone chamber 46, the fungi can be inhibited from adhering to the sterile zone conveyor 23.

Furthermore, during the above-described operation, as illustrated in FIG. 6, the first midstream-stage intermediate conveyor 24*b* and the second midstream-stage intermediate conveyor 24*c* of the gray zone conveyor 24 may be rotated. In this case, the first midstream-stage intermediate conveyor 24*b* and the second midstream-stage intermediate conveyor 24*c* of the gray zone conveyor 24 are rotated together with the upstream-stage intermediate conveyor 24*a* of the gray zone conveyor 24 and with the sterile zone conveyor 23. Accordingly, the sterilizer attaching to the sterile zone conveyor 23 and the upstream-stage intermediate conveyor 24*a* is scattered, and the scattered sterilizer attaches to the first midstream-stage intermediate conveyor 24*b* and the second midstream-stage intermediate conveyor 24*c*. With the rotation of the first midstream-stage intermediate conveyor 24*b* and the second midstream-stage intermediate conveyor 24*c*, the sterilizer is evenly attached to the entirety of the first midstream-stage intermediate conveyor 24*b* and the second midstream-stage intermediate conveyor 24*c*. Accordingly, even when fungi adhere to the first midstream-stage intermediate conveyor 24*b* and the second midstream-stage intermediate conveyor 24*c*, the fungi can be killed. As a result, even when fungi have entered the gray zone chamber 46, the fungi can be effectively inhibited from adhering to the sterile zone conveyor 23.

Moreover, during the above-described operation, the sterile zone conveyor 23 and the gray zone conveyor 24 are rotated while at least part of each of those conveyors is immersed in the sterilizer inside the storage section 48. In more detail, the sterile zone conveyor 23, the upstream-stage intermediate conveyor 24*a*, and the first midstream-stage intermediate conveyor 24*b*, the latter two belonging to the gray zone conveyor 24, are rotated while at least part of each of those conveyors is immersed in the sterilizer inside the storage section 48. Accordingly, the sterilizer can be evenly attached to the entirety of the sterile zone conveyor 23, the upstream-stage intermediate conveyor 24*a*, and the first midstream-stage intermediate conveyor 24*b*, the latter two belonging to the gray zone conveyor 24. As a result, fungi can be more effectively inhibited from adhering to the sterile zone conveyor 23, and the sterilization efficiency for the sterile zone conveyor 23 can be further increased.

On the other hand, when the sterilizer is supplied to the sterile zone chamber 45 in the outlet chamber 43, the downstream-stage intermediate conveyor 24*d* is stopped. Thus, since the downstream-stage intermediate conveyor 24*d* positioned adjacent to the non-sterile zone conveyor 25 and straddling the gray zone chamber 46 and the non-sterile zone 44 is stopped, the sterilizer can be more effectively inhibited from flowing out to the non-sterile zone 44. As a result, the worker working in the non-sterile zone 44 can be more effectively avoided from touching the sterilizer, and the safety of the work performed by the worker can be further improved.

There is a possibility that fungi may survive in the water supplied from the water supply unit 51 from the beginning. Some of those fungi have resistance to the component of the sterilizer. For instance, when the sterilizer contains peracetic acid, examples of fungi with resistance to the peracetic acid are *Bacillus cereus, B. polymyxa, B. megaterium, Paenibacillus chibensis, P. favisporus*, and *Chaetomium globosum*. When fungi have resistance to the component of the sterilizer like the above-mentioned fungi, there is a possibility that the fungi may survive in the sterilizer prepared in the tank T, and that, even when the sterile chamber 40 is sterilized with the sterilizer, the fungi in the sterilizer may remain in the sterile chamber 40. Particularly, when the temperature or the concentration of the sterilizer is low, or when the sterilization time is short, the fungi with resistance to the component of the sterilizer are difficult to kill, and a possibility of those fungi surviving in the sterilizer increases.

According to this embodiment, however, the sterilizer supplied to the sterile chamber 40 is heated by the heater H disposed in the circulation line 53, and the sterilizer is held at the desired temperature. Thus, because of the sterilizer being heated up to the desired temperature, even when the fungi with resistance to the component of the sterilizer survive in the water supplied to the tank T from the beginning, those fungi can be killed.

When the sterilizer is supplied to the sterile chamber 40, the temperature of the sterilizer may be 50° C. or higher and 80° C. or lower and preferably 60° C. or higher and 80° C. or lower. With the temperature of the sterilizer being 50° C. or higher, even when the fungi with resistance to the component of the sterilizer survive in the water supplied to the tank T from the beginning, those fungi can be efficiently killed. Particularly, with the temperature of the sterilizer being 60° C. or higher, even when the sterilizer contains peracetic acid and fungi with resistance to the peracetic acid survive in the water supplied to the tank T, those fungi can be efficiently killed. With the temperature of the sterilizer being 80° C. or lower, energy saving and cost reduction can be realized. Moreover, with the temperature of the sterilizer being 80° C. or lower, decomposition of the component (e.g., peracetic acid) contained in the sterilizer can be inhibited. On the other hand, depending on the case, namely when the decomposition of the component contained in the sterilizer can be inhibited with an additive or the like, or depending on the type of the sterilizer used, the temperature of the sterilizer may be 70° C. or higher and 90° C. or lower and preferably 75° C. or higher and 90° C. or lower. With the temperature of the sterilizer being 70° C. or higher, even when the fungi with resistance to the component of the sterilizer survive in the water supplied to the tank T from the beginning, those fungi can be efficiently killed.

(Recovery Step)

Then, the sterilizer having been supplied to the sterile chamber 40 is returned to the tank T. On that occasion, the pump P2 in the supply line 54 is driven, and the sterilizer having been supplied to the sterile chamber 40 is delivered to the second feedback pipe 54*b* (see FIG. 5). Then, the sterilizer having been delivered to the second feedback pipe 54*b* is returned to the tank T after passing through the second feedback pipe 54*b*. In such a manner, the heated sterilizer is circulated through the first supply pipe 53*a* of the circulation line 53 and the supply line 54 for a predetermined time.

Figure 7:
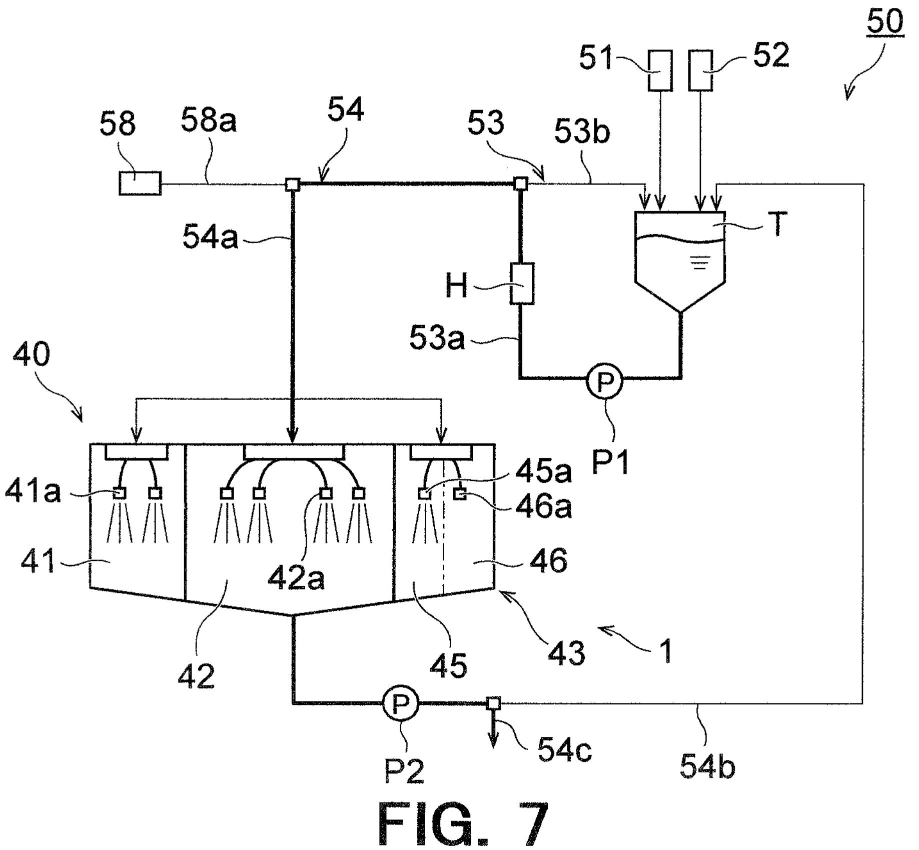
FIG. 7 is a block diagram illustrating the sterilization method according to the embodiment of the present disclosure.

Thereafter, as illustrated in FIG. 7, the sterilizer is discharged as a waste liquid to the outside through the drainpipe 54*c* disposed in the second feedback pipe 54*b* of the supply line 54. Note that, without performing the above-described recovery step, the sterilizer having been delivered to the second feedback pipe 54*b* from the sterile chamber 40 may be discharged as the waste liquid to the outside through the drainpipe 54*c*. In other words, the sterilizer having been delivered to the second feedback pipe 54*b* from the sterile chamber 40 may not need to be returned to the tank T.

(Sterile Water Supplying Step)

Then, the sterile water is supplied to the sterile chamber 40 through the supply line 54. On that occasion, the sterile water is supplied from the sterile water supply unit 58 to the sterilization chamber 41 and the filling chamber 42 in the sterile chamber 40 and to the sterile zone chamber 45 and the gray zone chamber 46 in the outlet chamber 43.

Figure 8:
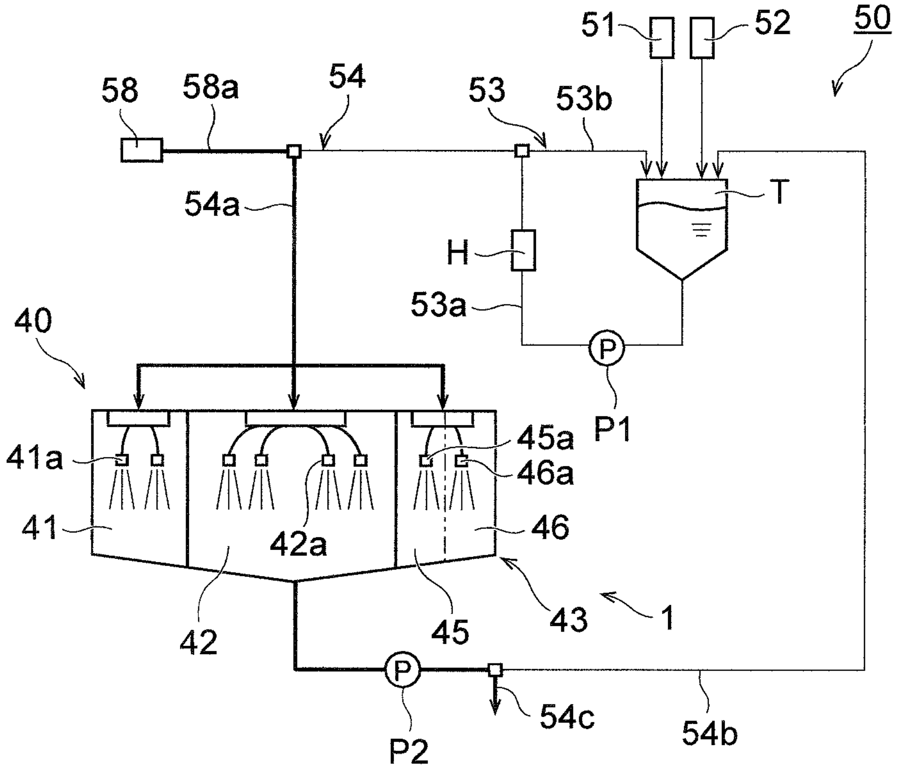
FIG. 8 is a block diagram illustrating the sterilization method according to the embodiment of the present disclosure.

In starting to supply the sterile water to the sterile chamber 40 through the supply line 54, an operation button (not illustrated) of the controller is first operated. With the operation of the button, a valve (not illustrated) is switched, whereupon the sterile water supply pipe 58*a* and the second supply pipe 54*a* are communicated with each other. Then, as illustrated in FIG. 8, the sterile water is supplied from the sterile water supply unit 58 to the second supply pipe 54*a* of the supply line 54 through the sterile water supply pipe 58*a*.

Then, the sterile water having been supplied to the second supply pipe 54*a* passes through the second supply pipe 54*a* and is supplied to the sterilization chamber 41 and the filling chamber 42 in the sterile chamber 40 and to the sterile zone chamber 45 and gray zone chamber 46 in the outlet chamber 43. Thus, the sterile water is injected into the chambers 41, 42, 45 and 46 through the injection nozzles 41*a*, 42*a*, 45*a* and 46*a* disposed in the chambers 41, 42, 45 and 46, respectively.

Figure 9:
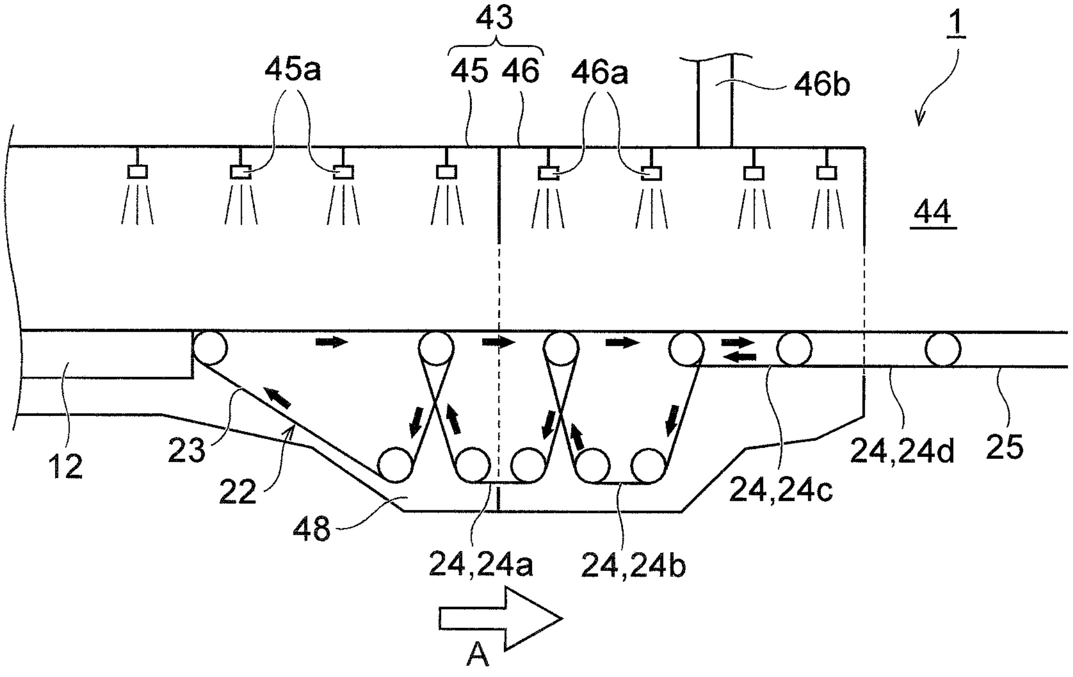
FIG. 9 is a schematic front view illustrating the sterilization method according to the embodiment of the present disclosure.

As illustrated in FIG. 9, when the sterile water is supplied to the sterile zone chamber 45 and the gray zone chamber 46 in the outlet chamber 43, the sterilizer is supplied to the sterile zone conveyor 23 while the sterile zone conveyor 23 is being rotated. This enables the entirety of the sterile zone conveyor 23 to be evenly cleaned with the sterile water. On that occasion, the non-sterile zone conveyor 25 may be stopped. This enables the sterilizer to be inhibited from flowing out to the non-sterile zone 44 even when the sterilizer attaching to the sterile zone conveyor 23 and the gray zone conveyor 24 is carried toward the downstream side in the conveying direction of the bottles 30 (i.e., the direction denoted by an arrow A in FIG. 9) with the rotation of the sterile zone conveyor 23 and so on. As a result, the worker working in the non-sterile zone 44 can be avoided from touching the sterilizer, and the safety of the work performed by the worker can be improved.

During the above-described operation, from among the multiple intermediate conveyors 24*a* to 24*d* of the gray zone conveyor 24, the upstream-stage intermediate conveyor 24*a* may be rotated, and the downstream-stage intermediate conveyor 24*d* may be stopped. In this case, the entirety of the upstream-stage intermediate conveyor 24*a* to which the sterilizer is attached can be evenly cleaned with the sterile water.

Furthermore, during the above-described operation, as illustrated in FIG. 9, the first midstream-stage intermediate conveyor 24*b* and the second midstream-stage intermediate conveyor 24*c* of the gray zone conveyor 24 may be rotated. This enables the entirety of the first midstream-stage intermediate conveyor 24*b* and the second midstream-stage intermediate conveyor 24*c* to which the sterilizer is attached to be evenly cleaned with the sterile water.

On the other hand, when the sterile water is supplied to the sterile zone chamber 45 and the gray zone chamber 46, the downstream-stage intermediate conveyor 24*d* is stopped. Thus, since the downstream-stage intermediate conveyor 24*d* positioned adjacent to the non-sterile zone conveyor 25 and straddling the gray zone chamber 46 and the non-sterile zone 44 is stopped, the sterilizer having attached to the downstream-stage intermediate conveyor 24*d* before the supply of the sterile water to the gray zone chamber 46 can be more effectively inhibited from flowing out to the non-sterile zone 44. As a result, the worker working in the non-sterile zone 44 can be more effectively avoided from touching the sterilizer, and the safety of the work performed by the worker can be further improved.

According to this embodiment, as described above, the sterilization method includes a sterilizer supplying step of supplying the sterilizer to the sterile zone conveyor 23 while the sterile zone conveyor 23 is being rotated, and a sterile water supplying step of supplying the sterile water to the sterile zone conveyor 23 while the sterile zone conveyor 23 is being rotated. Therefore, the sterilizer can be evenly attached to the entirety of the sterile zone conveyor 23, and the entirety of the sterile zone conveyor 23 can be evenly cleaned. As a result, the sterilization efficiency for the sterile zone conveyor 23 can be increased. Hence the sterilization efficiency in the content filling system 10 can be increased.

According to this embodiment, in the sterilizer supplying step and the sterile water supplying step, the upstream-stage intermediate conveyor 24*a* on the side closer to the sterile zone conveyor 23 is rotated, and the downstream-stage intermediate conveyor 24*d* on the side closer to the non-sterile zone conveyor 25 is stopped. Thus, with the rotation of the upstream-stage intermediate conveyor 24*a*, the sterilizer can be evenly attached to the entirety of the upstream-stage intermediate conveyor 24*a*. Therefore, even when fungi adhere to the upstream-stage intermediate conveyor 24*a* adjacent to the sterile zone conveyor 23, the fungi can be killed. As a result, even when fungi have entered the gray zone chamber 46, the fungi can be inhibited from adhering to the sterile zone conveyor 23. In addition, since the upstream-stage intermediate conveyor 24*a* is rotated in the sterile water supplying step, the entirety of the upstream-stage intermediate conveyor 24*a* can be evenly cleaned.

Moreover, the downstream-stage intermediate conveyor 24*d* is stopped. Since the downstream-stage intermediate conveyor 24*d* adjacent to the non-sterile zone conveyor 25 is stopped, the sterilizer can be more effectively inhibited from flowing out to the non-sterile zone 44. As a result, the worker working in the non-sterile zone 44 can be more effectively avoided from touching the sterilizer, and the safety of the work performed by the worker can be further improved.

According to this embodiment, in the sterilizer supplying step, the sterile zone conveyor 23 and the gray zone conveyor 24 are rotated while at least part of each of those conveyors is immersed in the sterilizer inside the storage section 48. Therefore, the sterilizer can be effectively attached to the sterile zone conveyor 23 and the gray zone conveyor 24. As a result, fungi can be more effectively inhibited from adhering to the sterile zone conveyor 23, and the sterilization efficiency for the sterile zone conveyor 23 can be further increased.

According to this embodiment, the sterilizer concentrate contains sodium hydroxide. In this case, even when fungi, such as *Bacillus cereus, B. polymyxa, B. megaterium, Paenibacillus chibensis, P. favisporus*, and *Chaetomium globosum*, survive in the water supplied to the tank T, the fungi can be effectively killed. As a result, reduction of the sterilization effect obtained by the sterilizer can be suppressed.

According to this embodiment, in the sterilizer supplying step, the non-sterile zone conveyor 25 is stopped. Therefore, the sterilizer can be inhibited from flowing out to the non-sterile zone 44. As a result, the worker working in the non-sterile zone 44 can be avoided from touching the sterilizer, and the safety of the work performed by the worker can be improved.

According to this embodiment, in the sterile water supplying step, the non-sterile zone conveyor 25 is stopped. Also in this case, the sterilizer can be inhibited from flowing out to the non-sterile zone 44.

Figure 10:
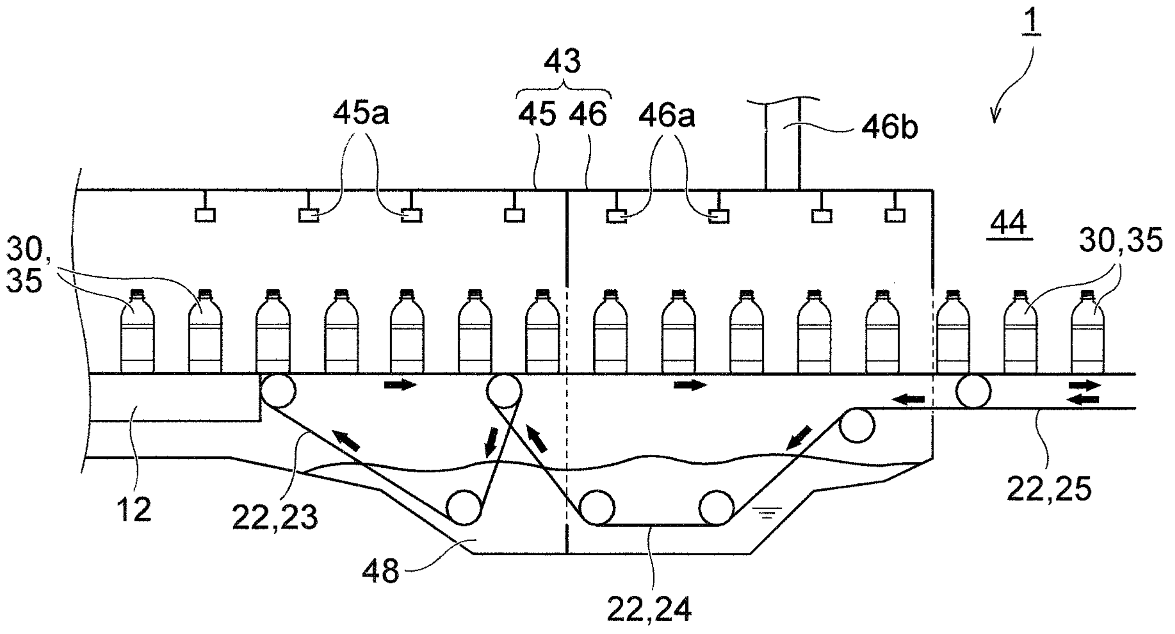
FIG. 10 is a schematic front view illustrating a modification of the outlet-side structure of the content filling system that is sterilized by the sterilization method according to the embodiment of the present disclosure.

The above embodiment has been described in connection with an example in which the gray zone conveyor 24 includes the multiple intermediate conveyors 24*a* to 24*d*, but the present disclosure is not limited to that example. In another example, as illustrated in FIG. 10, the gray zone conveyor 24 may be formed by a single conveyor. In such a modification, the gray zone conveyor 24 is arranged while straddling not only the sterile zone chamber 45 and the gray zone chamber 46, but also the gray zone chamber 46 and the non-sterile zone 44. The gray zone conveyor 24 receives the bottles 30 from the sterile zone conveyor 23 disposed in the sterile zone chamber 45 and transfers the received bottles 30 to the non-sterile zone conveyor 25.

Also in this modification, in the sterilizer supplying step, the sterile zone conveyor 23 is preferably rotated while at least part thereof is immersed in the sterilizer inside the storage section 48. This enables the sterilizer to be evenly attached to the entirety of the sterile zone conveyor 23. As a result, fungi can be inhibited from adhering to the sterile zone conveyor 23, and the sterilization efficiency for the sterile zone conveyor 23 can be increased.

In this modification, the gray zone conveyor 24 is preferably stopped in the sterilizer supplying step and the sterile water supplying step. Also in this case, since the gray zone conveyor 24 positioned adjacent to the non-sterile zone conveyor 25 and straddling the gray zone chamber 46 and the non-sterile zone 44 is stopped, the sterilizer can be more effectively inhibited from flowing out to the non-sterile zone 44. As a result, the worker working in the non-sterile zone 44 can be more effectively avoided from touching the sterilizer, and the safety of the work performed by the worker can be further improved.

Another additional step may be performed between the steps described in the above-described embodiment. For instance, a rinsing step of rinsing the inside of the second supply pipe 54*a* of the supply line 54 with the sterilizer heated by the heater H may be performed between the circulation step and the sterilization step. There is a possibility that the inside of the second supply pipe 54*a* is not maintained in the sterile state. This implies a possibility that fungi may mix into the water remaining in the second supply pipe 54*a* after the SOP in the preceding cycle, and that the fungi may have grown in the second supply pipe 54*a* during the production of the beverages after the SOP in the preceding cycle. Even in such a situation, by rinsing the inside of the second supply pipe 54*a* prior to the sterilization step, the above-mentioned fungi can be inhibited from mixing into the filling chamber 42 and so on.

Figure 11:
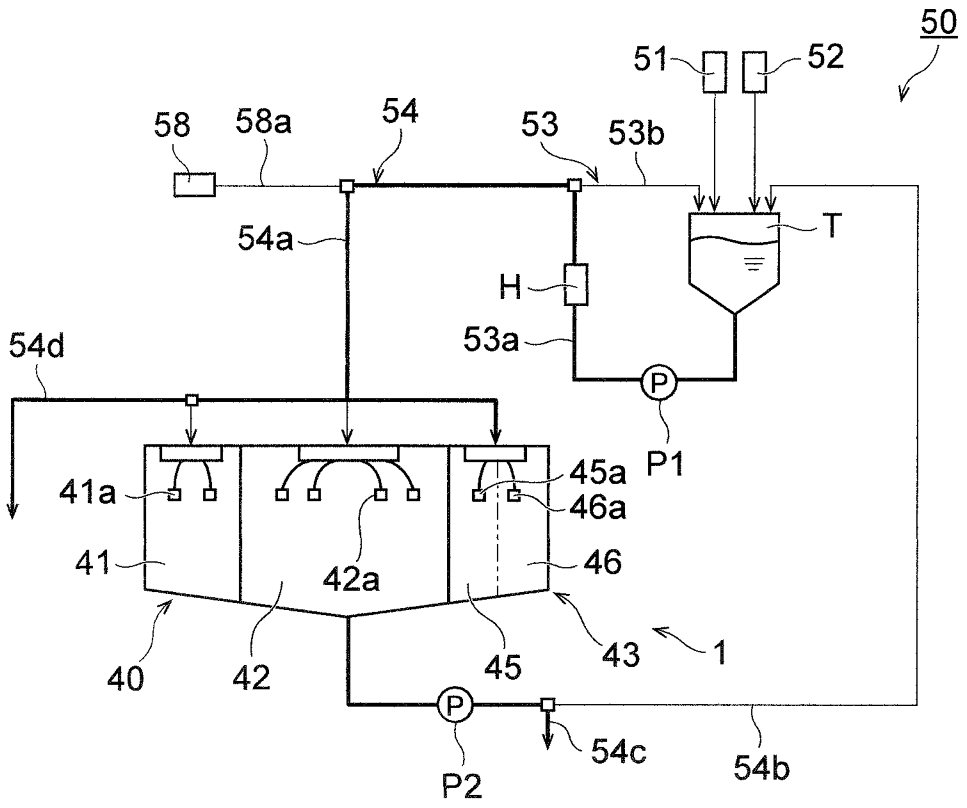
FIG. 11 is a block diagram illustrating a modification of the sterilization method according to the embodiment of the present disclosure.

In starting the rinsing step, then operation button (not illustrated) of the controller is operated after the circulation step. With the operation of the button, the valve (not illustrated) is switched, whereupon the first supply pipe 53*a* and the second supply pipe 54*a* are communicated with each other. Moreover, at that time, one of valves or the likes (not illustrated) disposed in the second supply pipe 54*a*, the one being positioned closest to the sterile chamber 40, is switched such that the sterile chamber 40 and the second supply pipe 54*a* are not communicated with each other. Then, as illustrated in FIG. 11, the sterilizer is supplied from the tank T to the second supply pipe 54*a* of the supply line 54 through the first supply pipe 53*a* of the circulation line 53. On that occasion, the sterilizer may be further heated by the heater H.

Then, the sterilizer having been supplied to the second supply pipe 54*a* passes through the second supply pipe 54*a* and is discharged as a waste liquid to the outside through a drainpipe 54*d* connected to the second supply pipe 54*a*.

In the above-described rinsing step, a volume of the sterilizer used to rinse the second supply pipe 54*a* is preferably at least once or more and 5 times or less than that of a sterilizer flow path in the second supply pipe 54*a*. When the volume of the sterilizer used is once or more than that of the sterilizer flow path in the second supply pipe 54*a*, the water used in the SOP in the preceding cycle and remaining in the second supply pipe 54*a* can be effectively removed. When the volume of the sterilizer used is 5 times or less than that of the sterilizer flow path in the second supply pipe 54*a*, an amount of the sterilizer used can be reduced, and the cost of the rinsing step can be reduced.

Thus, performing the rinsing step between the circulation step and the sterilization step can inhibit the fungi surviving in the second supply pipe 54*a* from mixing into the filling chamber 42 and so on. In addition, performing the rinsing step between the circulation step and the sterilization step enables the second supply pipe 54*a* to be heated with the sterilizer heated by the heater H. Accordingly, a temperature fall of the sterilizer in the second supply pipe 54*a* can also be suppressed when the sterilizer is supplied to pass through the second supply pipe 54*a* in the sterilization step.

The above embodiment has been described in connection with an example in which the sterilization method includes the circulation step, but the present disclosure is not limited to that example. In another example, although not illustrated, the sterilizer may be supplied to the sterile chamber 40 without being circulated through the circulation line 53.

The above embodiment has been described in connection with an example in which the sterilizer is newly prepared by diluting the sterilizer concentrate supplied from the sterilizer concentrate supply unit 52 with the water supplied from the water supply unit 51, but the present disclosure is not limited to that example. In another example, although not illustrated, the sterilizer having been used to perform the sterilization in the sterilization system 50 in the preceding cycle may be reserved for reuse (or multi-use) in the tank T or another recovery tank without being discharged.

The above embodiment has been described in connection with an example in which the content filling system 10 includes the bottle supply section 21, the bottle sterilization device 11, the air rinsing device 14, the sterile water rinsing device 15, the filling device 20, the cap fitting device 16, and the product bottle carrying-out unit 22, but the present disclosure is not limited to that example. In another example, although not illustrated, the content filling system 10 may not need to include the sterile water rinsing device 15.

Ones among the constituent elements disclosed in the above-described embodiment and modifications can be combined with each other as appropriate when required. As an alternative, some of all the constituent elements disclosed in the above-described embodiment and modifications may be omitted.

The invention claimed is:

1. A sterilization method for an outlet-side structure disposed on an outlet side of a filling chamber in which a filling device to fill contents into bottles is disposed, the outlet-side structure including:

an outlet chamber that includes a sterile zone chamber, which inside is kept in a sterile state, disposed downstream of the filling chamber and connected to the filling chamber; and a gray zone chamber, that isolates a sterile atmosphere and a non-sterile atmosphere from each other, disposed downstream of the sterile zone chamber and connected to the sterile zone chamber; and a non-sterile zone, that is a zone where fungi may exist connected to the outlet chamber, the sterile zone chamber including a cap fitting device disposed therein to fit a cap to the bottles filled with the contents and a sterile zone conveyor disposed therein to convey the bottles fitted with the cap, the gray zone chamber including a gray zone conveyor disposed therein to receive the bottles from the sterile zone conveyor and to convey the bottles, the non-sterile zone including a non-sterile zone conveyor disposed therein to receive the bottles from the gray zone conveyor and to convey the bottles, wherein the sterilization method comprises:

a sterilizer supplying step of supplying the sterilizer to the sterile zone conveyor while the sterile zone conveyor is being rotated, before the production of product bottles; and a sterile water supplying step of supplying sterile water to the sterile zone conveyor while the sterile zone conveyor is being rotated, before the production of product bottles;

a pressure in the filling chamber is set to be higher than that in the sterile zone chamber, and a pressure in the sterile zone chamber is set to be higher than that in the gray zone chamber.

2. The sterilization method according to claim 1, wherein the gray zone conveyor includes multiple intermediate conveyors, and in the sterilizer supplying step and the sterile water supplying step, from among the multiple intermediate conveyors, an upstream-stage intermediate conveyor on a side closer to the sterile zone conveyor is rotated, and a downstream-stage intermediate conveyor on a side closer to the non-sterile zone conveyor is stopped.

3. The sterilization method according to claim 1, wherein a storage section in which the sterilizer is stored is formed in the sterile zone chamber and the gray zone chamber, and in the sterilizer supplying step, the sterile zone conveyor and the gray zone conveyor are rotated while at least part of each of the sterile zone conveyor and the gray zone conveyor is immersed in the sterilizer inside the storage section.

4. The sterilization method according to claim 1, wherein the gray zone conveyor is formed by a single conveyor, and the gray zone conveyor is stopped in the sterilizer supplying step and the sterile water supplying step.

5. The sterilization method according to claim 4, wherein a storage section in which the sterilizer is stored is formed in the sterile zone chamber and the gray zone chamber, and in the sterilizer supplying step, the sterile zone conveyor is rotated while at least part of the sterile zone conveyor is immersed in the sterilizer inside the storage section.

6. The sterilization method according to claim 1, wherein temperature of the sterilizer is 50° C. or higher and 80° C. or lower in the sterilizer supplying step.

7. The sterilization method according to claim 1, wherein the sterilizer contains sodium hydroxide.

8. The sterilization method according to claim 1, wherein the non-sterile zone conveyor is stopped in the sterilizer supplying step.

9. The sterilization method according to claim 1, wherein the non-sterile zone conveyor is stopped in the sterile water supplying step.

10. The sterilization method according to claim 1, wherein the sterile zone chamber has a volume of 0.3 $m^3$ or more and 5 $m^3$ or less, and a supply amount of the sterilizer supplied to the sterile zone chamber is 1.2 $m^3/h$ or more and 12 $m^3/h$ or less.

* * * * *